United States Patent
Delus et al.

(10) Patent No.: US 7,111,890 B2
(45) Date of Patent: Sep. 26, 2006

(54) SUN VISOR FOR THE INTERIOR OF A MOTOR VEHICLE

(75) Inventors: Christian Delus, Retonfey (FR); Didier Weiss, Guerting (FR); Patrick Welter, Lachambre (FR); Frederic Selvini, Falck (FR)

(73) Assignee: Johnson Controls Interiors GmbH & Co. KG, Wuppertal (DE)

( * ) Notice: Subject to any disclaimer, the term of this patent is extended or adjusted under 35 U.S.C. 154(b) by 37 days.

(21) Appl. No.: 10/516,396

(22) PCT Filed: May 27, 2003

(86) PCT No.: PCT/EP03/05523

§ 371 (c)(1),
(2), (4) Date: May 26, 2005

(87) PCT Pub. No.: WO03/104003

PCT Pub. Date: Dec. 18, 2003

(65) Prior Publication Data
US 2005/0206186 A1 Sep. 22, 2005

(30) Foreign Application Priority Data
Jun. 5, 2002 (DE) ................................ 102 24 835

(51) Int. Cl.
*B60J 3/02* (2006.01)
(52) U.S. Cl. ................ 296/97.9; 296/97.12; 296/97.13
(58) Field of Classification Search ............ 296/97.11, 296/97.1, 97.4, 97.5, 97.8, 97.9, 97.12, 97.13, 296/97.7
See application file for complete search history.

(56) References Cited

U.S. PATENT DOCUMENTS

| | | | | |
|---|---|---|---|---|
| 390,790 A | * | 10/1888 | Luce | 296/97.12 |
| 1,664,124 A | * | 3/1928 | Lorenz | 248/279.1 |
| 1,806,059 A | * | 5/1931 | Hoople | 248/276.1 |
| 1,913,277 A | * | 6/1933 | Hoople | 248/276.1 |
| 1,941,032 A | * | 12/1933 | Knowles | 248/276.1 |
| 2,695,193 A | * | 11/1954 | Hamel | 296/97.13 |
| 4,681,363 A | | 7/1987 | Hemmeke et al. | |
| 4,762,359 A | | 8/1988 | Boerema et al. | |
| 4,783,111 A | | 11/1988 | Hemmeke et al. | |
| 4,925,232 A | | 5/1990 | Hemmeke et al. | |

(Continued)

FOREIGN PATENT DOCUMENTS

DE 29 02 734 A1 8/1980

(Continued)

*Primary Examiner*—H Gutman
(74) *Attorney, Agent, or Firm*—Foley & Lardner LLP

(57) ABSTRACT

A sun visor can be opened from a non-used position to an anti-glare position. The visor can be pivoted from a first anti-glare position in front of the windscreen to a second anti-glare position in front of a lateral window of the vehicle. The visor body is guided by a guide device in such a way that in each anti-glare position the same face of the body faces the vehicle interior. The visor body is guided both by a guide rail that is mounted on the roof liner and by an articulated arm that is rotatably mounted on the sun visor body for pivoting from the first anti-glare position to the second. The visor body can also be hinged for pivoting from the first anti-glare position to the second by a pair of articulated arms forming a four-bar mechanism with substantially vertical axes of rotation relative to the roof liner.

30 Claims, 6 Drawing Sheets

U.S. PATENT DOCUMENTS

| | | |
|---|---|---|
| 4,989,910 A | 2/1991 | Mersman et al. |
| 5,067,765 A | 11/1991 | Frye et al. |
| 5,071,186 A | 12/1991 | Hemmeke et al. |
| 5,080,420 A | 1/1992 | Hemmeke et al. |
| 5,182,675 A | 1/1993 | Arbisi et al. |
| 5,186,442 A | 2/1993 | Smith |
| 5,186,512 A | 2/1993 | VandenBerge et al. |
| 5,205,604 A | 4/1993 | Smith |
| 5,211,439 A | 5/1993 | Smith et al. |
| 5,219,199 A | 6/1993 | Smith et al. |
| 5,328,227 A | 7/1994 | Pax, Jr. et al. |
| 5,374,097 A | 12/1994 | George et al. |
| 5,409,284 A | 4/1995 | Mahler |
| 5,417,467 A | 5/1995 | Viertal et al. |
| 5,428,513 A | 6/1995 | Hiemstra et al. |
| 5,442,530 A | 8/1995 | Viertel et al. |
| 5,498,056 A | 3/1996 | Viertel et al. |
| 5,529,367 A | 6/1996 | Van Order et al. |
| 5,538,310 A | 7/1996 | Frankhouse et al. |
| 5,560,704 A | 10/1996 | Hiemstra et al. |
| 5,577,792 A | 11/1996 | Muyres et al. |
| 5,626,381 A | 5/1997 | Gervasoni et al. |
| 5,727,837 A | 3/1998 | Viertel |
| 5,810,421 A | 9/1998 | Kalkman et al. |
| 5,851,046 A | 12/1998 | Kalkman et al. |
| 5,871,251 A | 2/1999 | Welling et al. |
| 5,951,089 A | 9/1999 | Delus et al. |
| 5,975,708 A | 11/1999 | Fitzpatrick et al. |
| 6,045,175 A | 4/2000 | Viertel et al. |
| 6,203,161 B1 | 3/2001 | Busch et al. |
| 6,273,489 B1 | 8/2001 | Viertel et al. |
| 6,328,370 B1 | 12/2001 | Kim |
| 6,409,246 B1 | 6/2002 | Rennie |
| 6,474,717 B1 | 11/2002 | Viertel et al. |
| 2004/0098917 A1 | 5/2004 | Bourque et al. |
| 2004/0155489 A1 | 8/2004 | Kawasaki |

FOREIGN PATENT DOCUMENTS

| | | | |
|---|---|---|---|
| DE | 37 10 429 A1 | 10/1988 | |
| JP | 5330339 | * 12/1993 | ................ 296/97.1 |
| WO | WO 2004/058540 A2 | 7/2004 | |

* cited by examiner

SUN VISOR FOR THE INTERIOR OF A MOTOR VEHICLE

CROSS REFERENCE TO RELATED APPLICATIONS

The present Application claims the benefit of priority to the following International Application: PCT Patent Application No. PCT/EP03/0523 titled "Sun Visor For The Interior Of A Motor Vehicle" and filed on May 27, 2003, which claims priority to German Patent Application No. DE10224835.4 titled "Sun Visor For The Interior Of A Motor Vehicle" and filed on Jun. 5, 2002.

FIELD

The invention relates to a sun visor which can be opened out in the interior of a motor vehicle from a non-used position into anti-glare positions and can be pivoted from a first, essentially frontal anti-glare position into a second, essentially lateral anti-glare position.

BACKGROUND

Patent specification DE 38 29 976 C1 discloses a sun visor of the generic type which typically comprises a sun visor body which can be opened out both downward from a horizontal non-used position and from an anti-glare position in front of the windshield to a position in front of the side window of the vehicle by an L-shaped bearing bracket mounted rotatably in a pillow block, on the one hand, and in the sun visor body, on the other hand. In such known sun visors, the flat side of the sun visor body which faces outward in the first frontal anti-glare position faces the vehicle interior in the second, lateral anti-glare position.

This generally customary design is disadvantageous insofar as accessories, such as for example mirrors, retaining devices for parking tickets or the like, which are provided on a flat side of the sun visor body are accessible to the occupants only in one anti-glare position, usually the frontal position.

SUMMARY

The embodiments of the present invention are based on the object of providing a sun visor which avoids the above-mentioned disadvantages of the prior art.

The object is achieved according to the disclosed embodiments by a sun visor body that is guided by a guide device in such a manner that, in each anti-glare position, the same flat side of the sun visor body faces the vehicle interior.

According to a first embodiment, the sun visor body is guided pivotably from the first into the second anti-glare position via a rail guide, which is arranged on the roof lining of the vehicle and via an articulated arm which is arranged rotatably both on the roof lining and on the sun visor body. The articulated arm comprises two bent half arms which, when the sun visor is opened out from the non-used position into an anti-glare position, can be rotated in relation to each other about an essentially horizontal axis. In order to produce a joint, the half arms can have two limbs which can be inserted rotatably one inside the other. Preferably, the first half arm for pivoting the sun visor from the first into the second anti-glare position is mounted rotatably about a first essentially vertical axis in the roof lining, and the second half arm is mounted rotatably about a second, vertical axis, which is offset parallel to the first axis, in the sun visor body.

In order to retain the sun visor body in the frontal anti-glare position, the articulated arm can be latched releasably by a latching device to the sun visor body situated in the first, frontal anti-glare position.

The rail guide includes a guide rail, which is fastened to the roof lining and is arranged horizontally essentially transversely with respect to the direction of travel, and a slider which is fastened to the sun visor body. The slider may be provided with a bent arm piece which, when the sun visor is pivoted from the first into the second anti-glare position, can be rotated about an axis which is essentially vertical with respect to the guide rail. The sun visor body can preferably be opened out from the non-used position into an anti-glare position about an essentially horizontal limb of the arm piece. In this case, the arm piece and the articulated arm are in operative connection in such a manner that the sun visor body can only be opened out from the non-used position into an anti-glare position if the horizontal limbs of the articulated arm and the horizontal limb of the arm piece are aligned with one another.

By means of a locking device acting in the region of the horizontal limb of the arm piece, the sun visor body can be retained releasably in particular in its generally approximately horizontal non-used position.

According to another embodiment, the sun visor body is guided pivotably from the first into the second anti-glare position via a pair of articulated arms forming a four bar linkage, with axes of articulation which are essentially vertical with respect to the roof lining. The pair of articulated arms can be mounted on the sun visor in an articulated block, in which the sun visor is arranged in a manner such that it can be opened out about an essentially horizontal axis of articulation to pivot it from the non-used position into an anti-glare position, preferably with the use of a locking device which acts in the region of the horizontal axis and releasably retains the sun visor body in the non-used position.

The articulated arms of the four bar linkage are shown in contact in the first and/or second anti-glare position so as to form an end stop, it being possible between the articulated arms to provide a latching device which acts in the region of this end stop and retains the sun visor body in the desired anti-glare position. As an alternative, at least one joint of the four bar linkage can be designed such that it can be over-stretched in the manner of a toggle lever, overcoming a dead-center position, in order to lock the sun visor body in the first and/or second anti-glare position.

BRIEF DESCRIPTION OF THE FIGURES

The figures illustrate schematically different embodiments by way of example.

In the figures.

DETAILED DESCRIPTION

Figure 1:
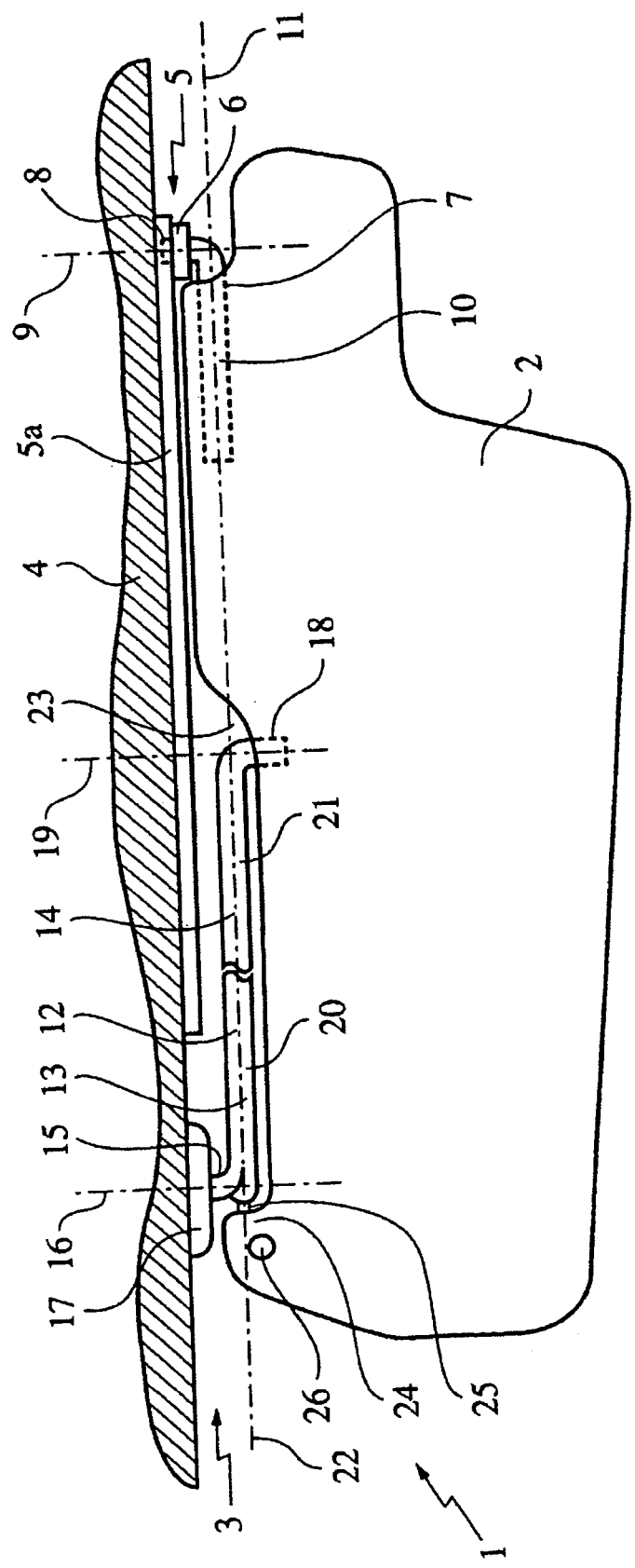
FIG. 1 shows a sun visor according to a first embodiment for the left vehicle occupant in a frontal anti-glare position from the vehicle occupant view.

The sun visor 1 which is illustrated in FIG. 1 comprises a sun visor body 2 which is connected to the roof lining 4 of a motor vehicle via a guide device 3.

Figure 2:
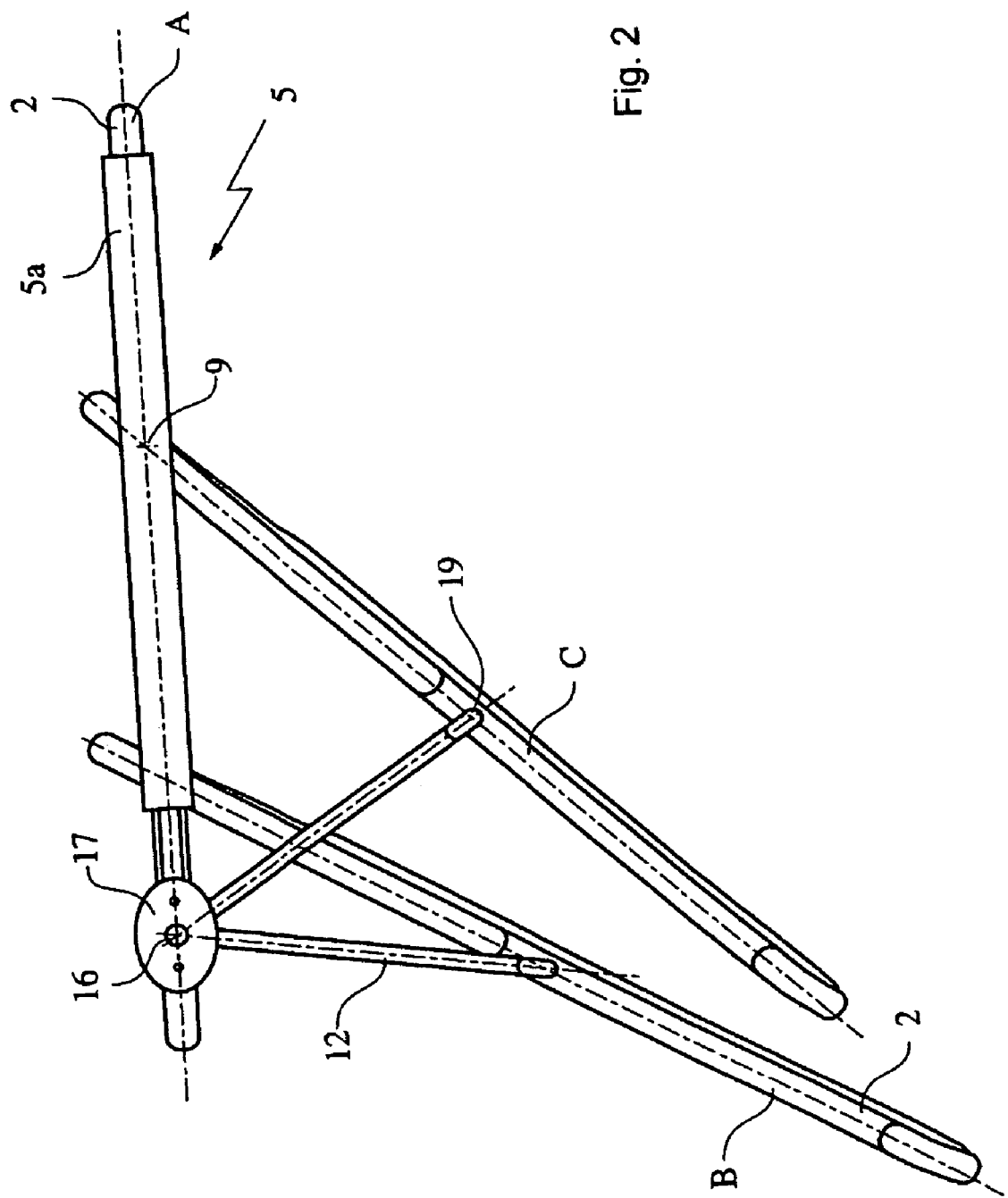
FIG. 2 shows the sun visor according to FIG. 1 in a top view in various anti-glare positions.

The guide device 3 comprises, (as shown in FIG. 2), a rail guide 5 with a guide rail 5a which is arranged in a fixed position on the roof lining 4 and extends horizontally and transversely with respect to the direction of travel (Y-axis of the vehicle). A slider 6 is inserted into the guide rail 5a in a longitudinally displaceable manner and accommodates a bent arm piece 7. The arm piece 7 can be rotated with its first limb 8 about a vertical axis 9 in the slider 6 and with its second limb 10 about a horizontal axis 11 in the sun visor body 2.

The guide device 3 further comprises an articulated arm 12 which is composed from two bent half arms 13, 14. The first half arm 13 is mounted with one limb 15 in a rotatable manner about a vertical axis of rotation 16 in a small pillow block 17, which is fastened to the roof lining 4 in the vicinity of the side window of the vehicle, while the second half arm 14 engages with a limb 18 in a rotatable manner about a vertical axis of rotation 19 approximately centrally in the upper edge of the sun visor body 2. The two half arms 13, 14 are connected to each other rotatably about a horizontal axis of rotation 22 by their remaining limbs 20, 21, which can be inserted one inside the other. On its upper edge, the sun visor body 2 has a recess 23 which provides the space necessary for receiving the articulated arm 12.

When the horizontal axes of rotation 11 and 22 of the arm piece 7 and of the articulated arm 12 are aligned with each other, the sun visor body can be opened out downward in front of the windshield from an approximately horizontal non-used position, in which it rests, if appropriate, against the roof lining 4, into the frontal anti-glare position (shown as position A). In the process, the half arms 13, 14 rotate in relation to each other about the horizontal axis of rotation 22 and the arm piece 7 rotates about the axis of rotation 11 which is horizontal with respect to the sun visor body 2.

As is apparent in FIG. 2, the sun visor body can be pivoted from position A via any desired intermediate positions (for example position C) into a lateral anti-glare position (position B), in which the side window of the vehicle is covered in some regions. In this case, the articulated arm 12 rotates in small pillow blocks 17 and the sun visor body 2 rotates about the vertical axes of rotation 16 and 19. At the same time, the slider 6 is displaced horizontally and transversely with respect to the direction of travel outward toward the side window in the guide rail 5a, the arm piece 7 rotating in the slider 6 about the vertical axis of rotation 9. The visor may be pivoted-back into the frontal anti-glare position A by a reverse sequence of movement.

Figure 4:
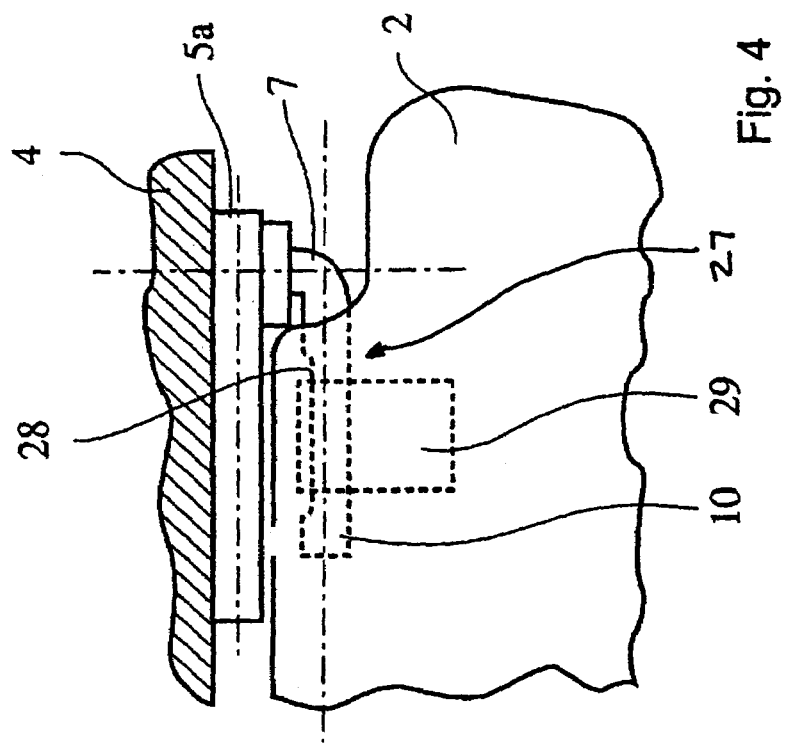
FIG. 4 shows an enlarged detail from FIG. 1 with an illustration of the locking device.
Figure 3:
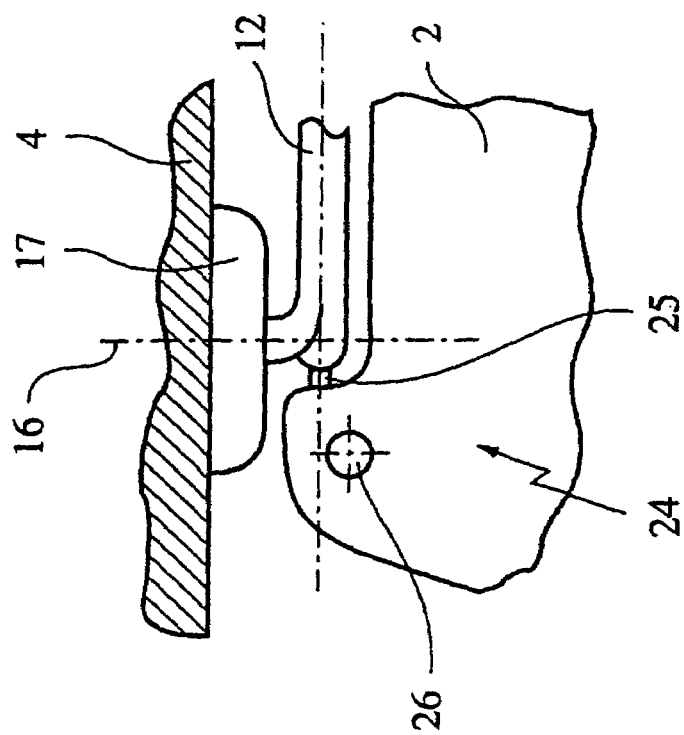
FIG. 3 shows an enlarged detail from FIG. 1 together with an illustration of the latching device.

An unintentional pivoting of the sun visor body into the lateral anti-glare position can be avoided by the latching device 24, which is illustrated on an enlarged scale in FIG. 3. A projection 25 protrudes outward horizontally from the half arm 13 and latches in the lateral region of the recess 23 of the sun visor body 2. Pressing of a button 26 embedded next to it in the sun visor body 2 enables the latching connection to be released and the sun visor body 2 to be pivoted without reaching over into the lateral anti-glare position. Furthermore, as is apparent from FIG. 4, a locking device 27 is provided in the sun visor body 2, said locking device having a leaf spring 29 which acts on a flattened section 28 of the limb 10 of the arm piece 7 and where the sun visor body 2 is retained releasably in the non-used position.

Figure 5:
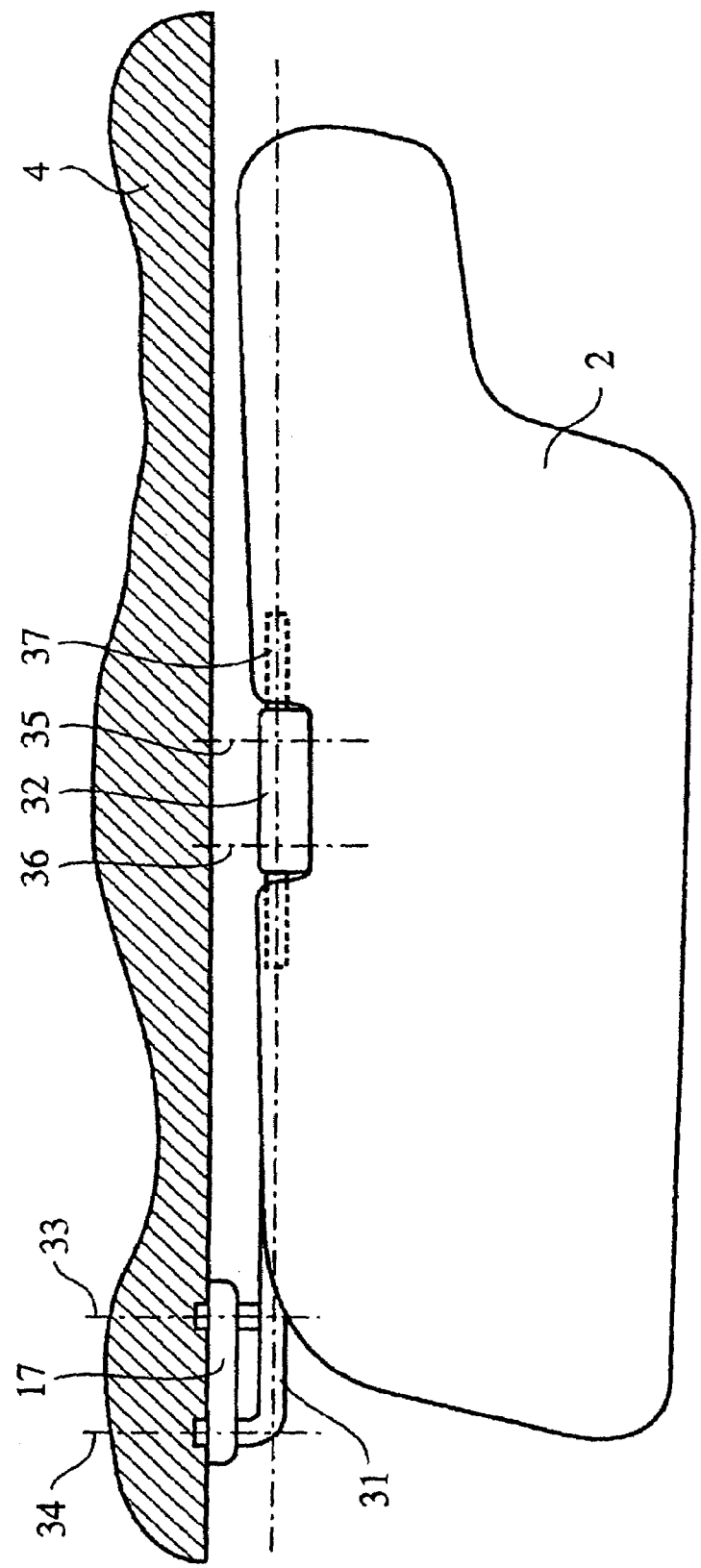
FIG. 5 shows a further sun visor according to another embodiment in a frontal anti-glare position from the vehicle occupant's view.
Figure 6:
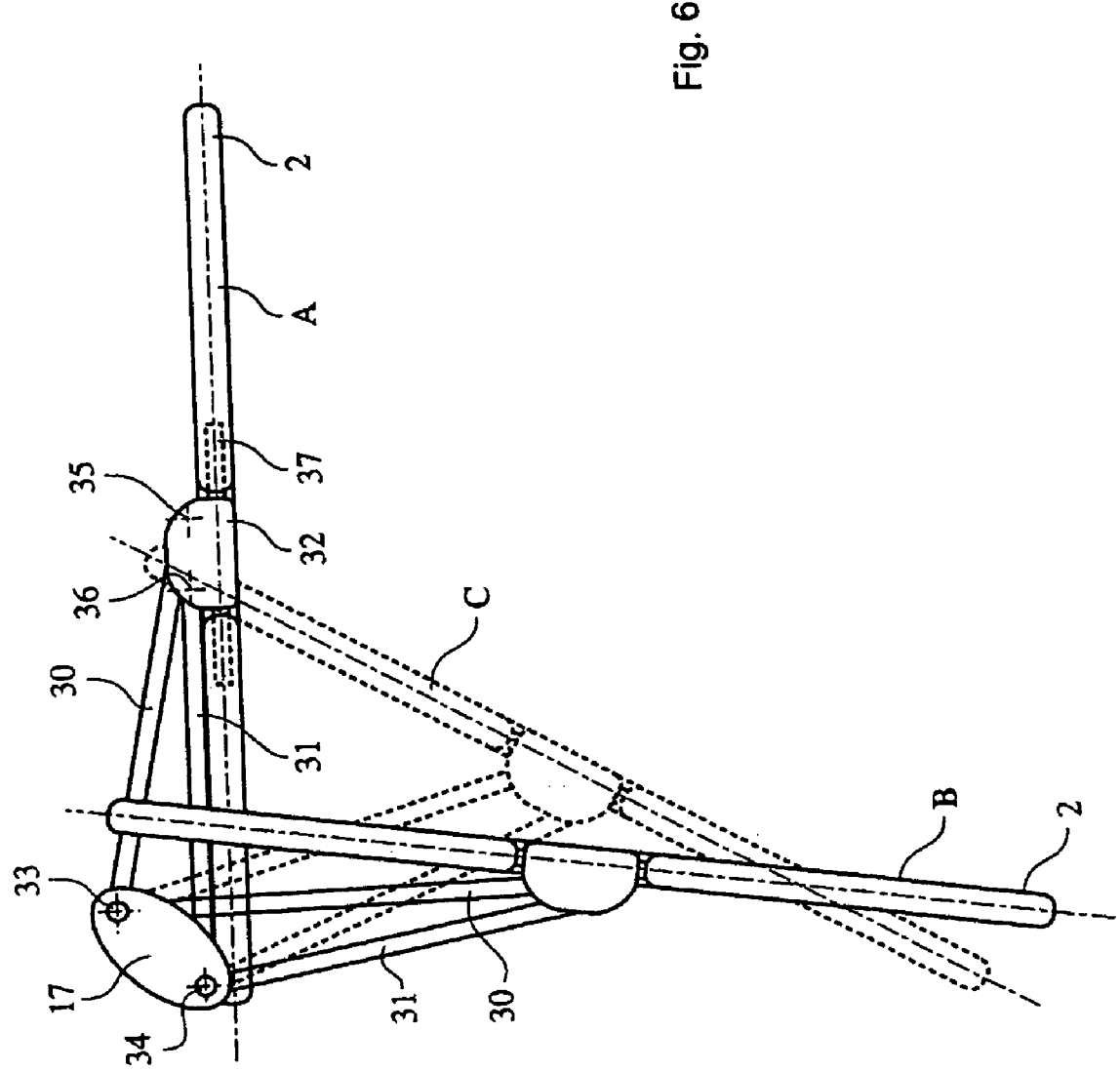
FIG. 6 shows the sun visor from FIG. 5 in top view in various anti-glare positions.
Figure 7:
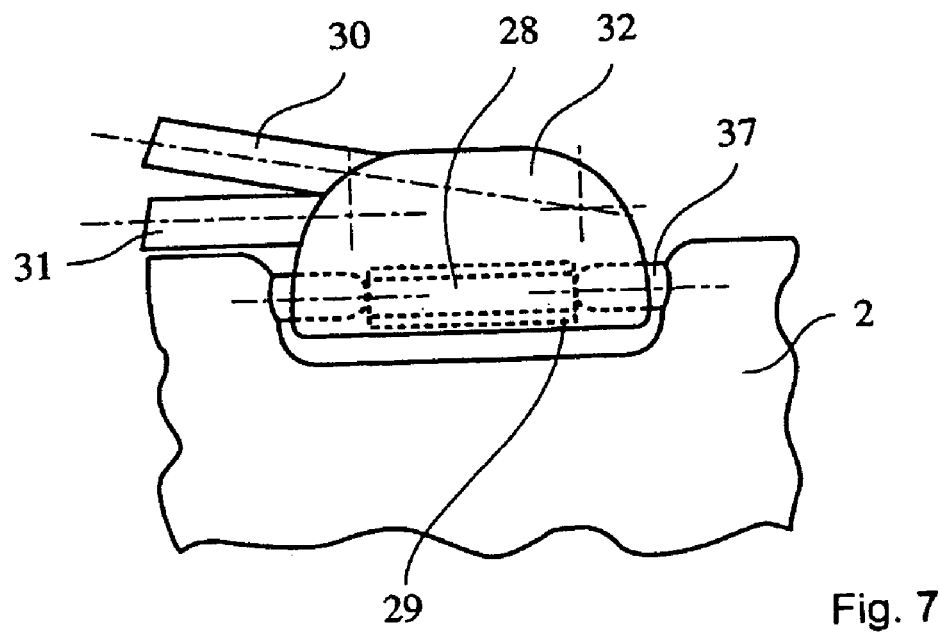
FIG. 7 shows an enlarged detail from FIG. 1 together with an illustration of the locking device.

In the embodiment illustrated in FIGS. 5 and 6, the guide device 3 for the sun visor body 2 is shown as a four bar linkage, with a doubly bent pair of articulated arms 30, 31 mounted at a distance from each other at one end in the small pillow block 17 and at their other end in an articulated block 32 in a manner such that they can rotate about vertical axes of rotation 33 to 36. While the small pillow block 17 is connected in a fixed position to the roof lining 4, the articulated block 32 accommodates a spindle piece 37 which is embedded into the sun visor body 2 and about which the latter can be opened from any desired non-used position into an anti-glare position. A locking device 27, which acts analogously to the previously described device, in the articulated block 32 retains the sun visor body 2 in the non-used position (see FIG. 7).

Figure 8:
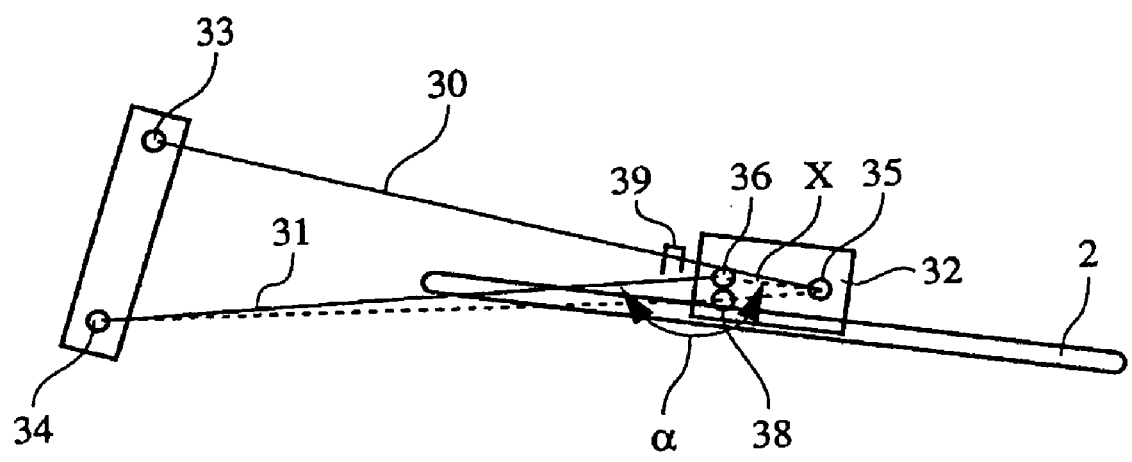
FIG. 8 shows a schematic diagram of the design of the four bar linkage from FIG. 5.

The sun visor body 2 may be retained in the frontal anti-glare position (position A) by the four bar linkage which is shown overstretched in the manner of a toggle lever beyond a dead-center position 38 into the position illustrated in FIG. 8, with the articulated arms 30, 31 being briefly elastically deformed. In the end position, a virtual straight line X, which connects the axes of rotation 35, 36 in the articulated block 32, is no longer aligned with the rear axis of rotation 34, but encloses an obtuse angle α together with the associated articulated arm 31. In this case, the bent region of the rear articulated arm 31, which forms the axis of rotation 36, bears laterally against the other articulated arm 30 and serves as an end stop for the four bar linkage. In addition or as an alternative to the toggle lever design, a releasable latching device 39 acting between the articulated arms 30, 31 can be provided.

The sun visor body 2 may also be retained in the lateral anti-glare position.

What is claimed is:

1. A sun visor for a vehicle interior, comprising: a body having a flat side that is movable from a non-used position to an anti-glare position and which can be pivoted from a first frontal anti-glare position to a second lateral anti-glare position, wherein the body is guided by a pair of articulated arm arranged in a side-by-side manner so that in the first anti-glare position and the second anti-glare position the same flat side of the body faces the vehicle interior.

2. The sun visor of claim 1, wherein the body is guided pivotably from the first to the second anti-glare position via a rail guide which is arranged on a roof lining of the vehicle interior and via one said articulated arm rotatably coupled to the roof lining and the body.

3. The sun visor of claim 2, wherein the articulated arm comprises two bent arm portions that are configured to be rotated in relation to each other about a substantially horizontal axis of rotation.

4. The sun visor of claim 3, wherein the two bent arm portions further comprise two limb portions which can be inserted rotatably one inside the other.

5. The sun visor of claim 3, wherein one of the bent arm portions is mounted rotatably about a substantially vertical first axis of rotation in the roof lining, and the other of the bent arm portions is mounted rotatably about a second vertical axis of rotation in the body which is offset substantially parallel to the first vertical axis of rotation.

6. The sun visor of claim 2, wherein the articulated arm can be latched releasably by a latching device to the body situated in the first, frontal anti-glare position.

7. The sun visor of claim 3, wherein the rail guide comprises a guide rail fastened to the roof lining and arranged horizontally and a slider which is fastened to the body.

8. The sun visor of claim 7, wherein the slider comprises a bent arm piece which is rotatable about an axis of rotation which is substantially vertical with respect to the guide rail.

9. The sun visor of claim 8, wherein the body is movable from the non-used position to the frontal anti-glare position about a substantially horizontal portion of the bent arm piece.

10. The sun visor of claim 9, wherein the bent arm piece and the articulated arm are in operative connection in such a manner that the body can only be moved from the non-used position to one of the anti-glare positions if a substantially horizontal section of each bent arm portion of the articulated arm and the horizontal portion of the bent arm piece are aligned with one another.

11. The sun visor of claim 9, further comprising a locking device disposed proximate the horizontal portion of the bent arm piece and configured to releasably retain the body in the non-used position.

12. The sun visor of claim 1, wherein the pair of articulated arms form a four bar linkage, with axes of rotation substantially vertical with respect to the roof lining.

13. The sun visor of claim 12, wherein the pair of articulated arms are mounted rotatably in an articulated block so that the body can be moved about a substantially horizontal spindle piece from the non-used position one of the anti-glare positions.

14. The sun visor of claim 13, further comprising a locking device disposed proximate the horizontal spindle piece and configured to releasably retain the body in the non-used position.

15. The sun visor of claim 12, wherein the articulated arms are in contact in at least one of the first and second anti-glare position so as to form an end stop.

16. The sun visor of claim 15, further comprising a latching device acting between the articulated arms proximate the end stop.

17. The sun visor of claim 12, wherein at least one joint of the four bar linkage is configured as an over-center device to lock the body in at least one of the first and second anti-glare position.

18. A sun visor for a vehicle, comprising:
a body panel;
a first block configured to couple to the vehicle;
a second block configured to couple to the body panel;
a first linkage rotatably coupled to the first block and the second block;
a second linkage rotatably coupled to the first block and the second block; so that the first block and the second block and the first linkage and the second linkage are configured as a four bar linkage for movement of the body panel between a nonuse position substantially along a roof lining of the vehicle and a plurality of use positions.

19. The sun visor of claim 18, wherein the second block further comprises a spindle for movement of the body panel about a substantially horizontal axis.

20. The sun visor of claim 18, wherein first and second ends of the first linkage and the second linkage are rotatable about substantially vertical axes.

21. The sun visor of claim 18, wherein the first linkage and the second linkage are configured as an over-center device.

22. A visor for a vehicle, comprising:
a visor body;
a spindle coupled to the visor body;
a first block coupled to the spindle;
a second block configured for attachment to the vehicle;
a pair of arms each having a first end pivotally coupled to the first block and a second end pivotally coupled to the second block to form a four bar linkage.

23. The visor of claim 22 wherein the four bar linkage is movable to position the visor body in a plurality of positions between a lateral position and a frontal position.

24. The visor of claim 22 wherein the four bar linkage is arranged to include an over-center point proximate at least one of the lateral position and the frontal position.

25. The visor of claim 23 wherein the four bar linkage is arranged with end stops to prevent movement of the visor body substantially beyond the lateral position and the frontal position.

26. The visor of claim 22 wherein the first block is pivotally coupled to the spindle.

27. The visor of claim 22 wherein the first block further comprises a spring member engagable with the spindle to retain the visor body in a predetermined position.

28. A visor for a vehicle, comprising:
a visor body;
a first arm having a first end and a second end, the first end pivotally coupled to the visor body and the second end configured for attachment to the vehicle;
a second arm having a first end and a second end, the first end pivotally coupled to the visor body and the second end configured for attachment to the vehicle;
wherein the first arm and the second arm and the visor body are configured to form a four bar linkage with the vehicle for movement of the visor to a plurality of positions.

29. The visor of claim 28 wherein the four bar linkage is arranged to include an over-center point.

30. The visor of claim 28 further comprising a first block coupled to the visor body and the first end of the arms and a second block coupled to the second end of the arms and configured for coupling to the vehicle.

* * * * *